(12) United States Patent
Yao

(10) Patent No.: US 7,666,922 B2
(45) Date of Patent: Feb. 23, 2010

(54) FLAME-RETARDANT BIODEGRADABLE MATERIAL AND MANUFACTURING METHOD OF THE SAME, FLAME-RETARDANT BIODEGRADABLE POLYMERIC COMPOSITION, AND MOLDED PRODUCT AND DISPOSAL METHOD OF THE SAME

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 614 days.

(21) Appl. No.: 11/133,354

(22) Filed: May 20, 2005

(65) Prior Publication Data
US 2006/0035998 A1 Feb. 16, 2006

(30) Foreign Application Priority Data
Aug. 12, 2004 (JP) .............................. 2004-235559

(51) Int. Cl.
*C09D 5/16* (2006.01)
*C09K 21/14* (2006.01)
*C08K 5/04* (2006.01)
*C08G 77/04* (2006.01)

(52) U.S. Cl. .................. 523/122; 524/261; 252/609; 528/26; 528/41; 528/43

(58) Field of Classification Search .............. 523/124, 523/122; 524/261; 252/609; 528/26, 41, 528/43
See application file for complete search history.

(56) References Cited

U.S. PATENT DOCUMENTS

| 5,070,169 A * | 12/1991 | Robertson et al. .............. 528/25 |
| 2004/0034121 A1 * | 2/2004 | Nozaki et al. ................ 523/124 |
| 2004/0152176 A1 | 8/2004 | Kumar et al. |

FOREIGN PATENT DOCUMENTS

| JP | A 2002-173583 | 6/2002 |
| JP | A 2003-003077 | 1/2003 |
| JP | A 2003-183473 | 7/2003 |

\* cited by examiner

*Primary Examiner*—Kriellion A Sanders
(74) *Attorney, Agent, or Firm*—Oliff & Berridge, PLC

(57) ABSTRACT

A flame-retardant biodegradable material comprises a compound represented by formula (1):

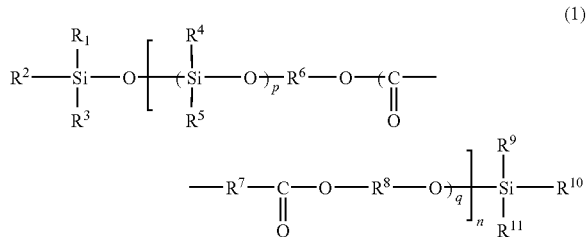

wherein $R^1$, $R^2$, $R^3$, $R^4$, $R^5$, $R^9$, $R^{10}$ and $R^{11}$ each independently represents an alkyl group, an aryl group, or an aralkyl group; $R^6$, $R^7$ and $R^8$ each independently represents an alkylene group; and n, p, and q each independently represents an integer of one or more.

3 Claims, 1 Drawing Sheet

FLAME-RETARDANT BIODEGRADABLE MATERIAL AND MANUFACTURING METHOD OF THE SAME, FLAME-RETARDANT BIODEGRADABLE POLYMERIC COMPOSITION, AND MOLDED PRODUCT AND DISPOSAL METHOD OF THE SAME

BACKGROUND OF THE INVENTION

1. Field of the Invention

The present invention relates to a flame-retardant biodegradable material and a manufacturing method thereof, a flame-retardant biodegradable polymeric composition, and a molded product and a method of disposal thereof.

2. Description of the Related Art

Under the concept that "the 21st century is an age of the environment", a variety of environmental techniques have been investigated and proposed in order to build up circulation-type communities and as one of such techniques, biodegradable polymers have attracted attention.

The biodegradable polymers are polymers which can be theoretically decomposed into water and carbon dioxide units by microorganisms existing in soil or water or hydrolysis and are materials which are expected to have a high effect on reduction in industrial waste and saving in petroleum resources.

On the other hand, the biodegradable polymers in general have defects in mechanical strength and heat resistance. In order to overcome these defects, a technique to add a natural filler such as mica has been proposed (see JP-A-2002-173583)

In some cases where the biodegradable polymers are used as molding materials, the biodegradable polymers are expected to have flame resistance in addition to the above-described mechanical strength and heat resistance. However, any practical method for affording the flame resistance to the biodegradable polymers has not been established yet.

One of the reasons that make it difficult to afford the flame resistance to the biodegradable polymers is that flame retardant additives hitherto used for materials other than the biodegradable polymers can not be used for the biodegradable polymers. For example, phosphoric ester-series flame retardant additives themselves show high hydrolytic action and in addition, the biodegradable polymers promote hydrolysis of the flame retardant additives to make it impossible to secure sufficient flame resistance. Furthermore, hydrolyzates of the flame retardant additives cause the degradable polymers to deteriorate under the ordinary conditions of use. Although halogen-containing polymer-series flame retardant additives are known as other flame retardant additives, blends of the additives with the biodegradable polymers makes it impossible to say that such materials have biodegradability as a whole and to become a fundamental solution.

SUMMARY OF THE INVENTION

The invention has been performed under the circumstances and provides a flame-retardant biodegradable material that can have flame resistance while maintaining sufficiently the biodegradability of a biodegradable polymer and a manufacturing method thereof. Furthermore, the invention provides a flame-retardant biodegradable polymeric composition where the flame-retardant biodegradable material is used, a molded product prepared therefrom, and a method of disposal thereof.

The flame-retardant biodegradable materials of the invention includes a compound represented by the following general formula (1):

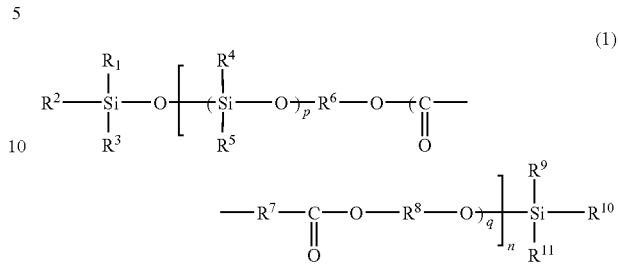

[In the formulas, $R^1$, $R^2$, $R^3$, $R^4$, $R^5$, $R^9$, $R^{10}$ and $R^{11}$ each independently represents an alkyl group, an aryl group, or an aralkyl group, $R^6$, $R^7$ and $R^8$ each independently represents an alkylene group, and n, p and q each independently represents an integer of one or more]

According to the flame-retardant biodegradable materials of the invention, blending with biodegradable polymers can afford sufficient flame resistance while maintaining the biodegradability of biodegradable polymers sufficiently. Particularly, the flame-retardant biodegradable materials of the invention can effectively control dropping of kindling charcoal during burning. Moreover, the flame-retardant biodegradable materials of the invention can give sufficient flame resistance to the biodegradable polymers even in use of a comparative small amount of the materials, and accordingly can have characteristics which the polymers have inherently such as mechanical strength and heat resistance in addition to the biodegradability.

Although reasons why the flame-retardant biodegradable materials of the invention bring about the above-described effect are not necessarily clear, the present inventors suppose as follows. That is, since compatibility with biodegradable polymers is heightened as entire molecules by combination of (poly)organosiloxane structures effective in flame resistance and aliphatic (poly)ester structures in the invention, the flame-retardant biodegradable materials can be sufficiently dispersed into the biodegradable polymers and thus, it becomes possible to afford the flame resistance stemming from the above-described organosiloxane structures to the biodegradable polymers. Furthermore, the inventors think that the biodegradability of the flame-retardant biodegradable materials themselves and moreover the mechanical strength and heat resistance can be sufficiently secured by combination of the (poly)organosiloxane structures and the aliphatic (poly)ester structures.

The method for manufacturing a flame-retardant biodegradable material of the invention includes:

heating a mixture containing a compound represented by the following general formula (2), a compound represented by the following general formula (3), a compound represented by the following general formula (4) a a compound represented by the following general formula (5) in the presence of at least one of an esterification catalyst and a transesterification catalyst (first step); and adding an polymerization catalyst to a reaction mixture prepared in the first step and heating under reduced pressure to form a polymer represented by the following general formula (1) (second step).

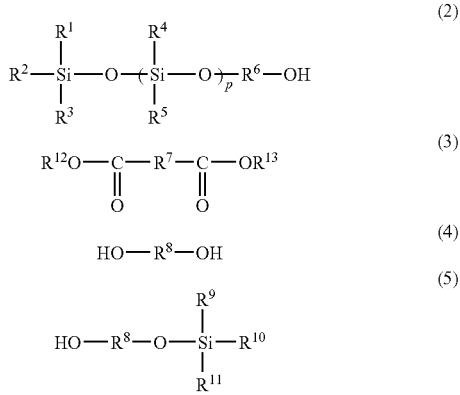

[In the formulas, $R^1$, $R^2$, $R^3$, $R^4$, $R^5$, $R^9$, $R^{10}$ and $R^{11}$ each independently represents an alkyl group, an aryl group or an aralkyl group; $R^6$, $R^7$ and $R^8$ each independently represents an alkylene group; $R^{12}$ and $R^{13}$ each independently represents a hydrogen atom or an alkyl group; and n, p and q each independently represents an integer of one or more.

According to the above-described manufacturing method, it is possible to obtain easily and surely the flame-retardant biodegradable materials of the invention which can afford the flame resistance while maintaining sufficiently the biodegradability of the biodegradable polymers.

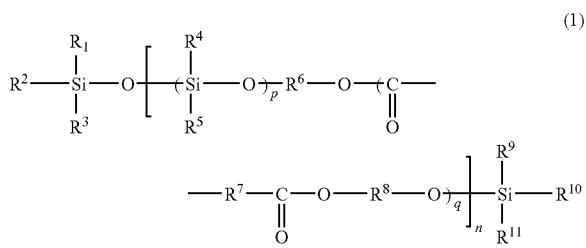

The flame-retardant biodegradable polymer composition of the invention contains: a flame-retardant biodegradable material including a compound represented by the following general formula (1); and a biodegradable polymer.

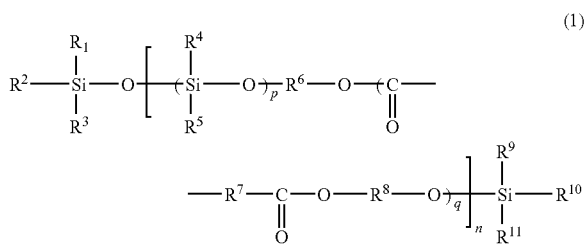

[In the formulas, $R^1$, $R^2$, $R^3$, $R^4$, $R^5$, $R^9$, $R^{10}$ and $R^{11}$ each independently represents an alkyl group, an aryl group or an aralkyl group, $R^6$, $R^7$ and $R^8$ each independently represents an alkylene group, and n, p and q each independently represents an integer of one or more.]

Thus, the polymeric compositions having excellent biodegradability and flame resistance can be obtained by combination of the flame-retardant biodegradable materials and biodegradable polymers.

The molded products of the invention are prepared by molding of the flame-retardant biodegradable polymeric compositions of the invention.

Thus, the molded products excellent in biodegradability and flame resistance can be prepared by use of the above-described flame-retardant biodegradable polymeric compositions of the invention as the molding materials.

The molded products of the invention are preferably housings and more preferably housings for business and office machines in view of easiness of recovery.

A method of disposal of the molded products of the invention includes allowing the biodegradation of the molded products of the invention and separating silicon-containing components from the residues.

When the molded products of the invention are subjected to biodegradation in the above-described method of disposal, parts corresponding to aliphatic (poly)ester structures of the general formula (1) and biodegradable polymers undergo biodegradation, but parts corresponding to (poly)organosiloxane structures of the general formula (1) remain in residue without decomposing as silicone-containing components (usually, oligomers having some degrees of size). These silicone-containing components can be separated by centrifugal filtration after adding water to the residue and the silicone-containing components thus separated can be reused as starting materials for the silicone-containing compounds. Thus, according to the method of disposal of the molded products of the invention, waste disposal sufficiently low in environmental load can be carried out without producing harmful substances by the biodegradation and furthermore, the resource recovered can be efficiently reused.

BRIEF DESCRIPTION OF THE DRAWING

Preferred embodiments of the present invention will be described in detail based on the following FIGURE, wherein.

DETAILED DESCRIPTION OF THE INVENTION

Figure 1:
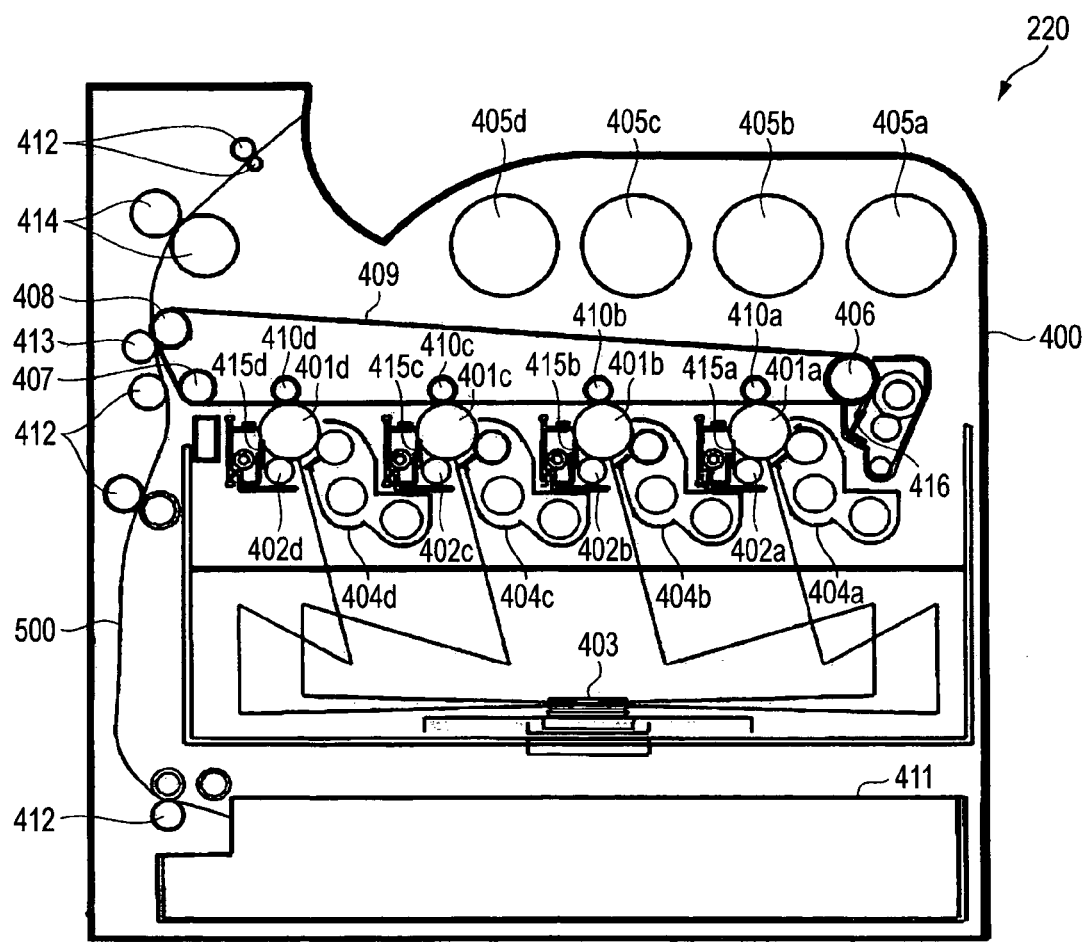
FIG. 1 is an outline block diagram showing an example of electrophotographic apparatus equipped with an outer housing (housing) relating to the molded product of the invention.

Suitable modes for carrying out the invention are hereinafter described in detail.

The flame-retardant biodegradable materials of the invention have a structure represented by the following general formula (1).

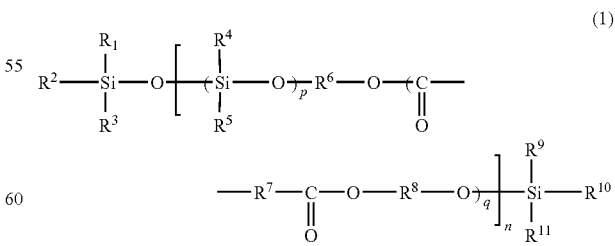

In general formula (1), $R^1$, $R^2$, $R^3$, $R^4$, $R^5$, $R^9$, $R^{10}$, and $R^{11}$ each independently represents an alkyl group, an aryl group, or an aralkyl group. When groups represented by $R^1$, $R^2$, $R^3$, $R^4$, $R^5$, $R^9$, $R^{10}$, and $R^{11}$ are alkyl groups, the alkyl groups may be any of straight chain or branched chain. The groups represented by $R^1$, $R^2$, $R^3$, $R^4$, $R^5$, $R^9$, $R^{10}$, $R^{11}$ are not particularly limited as long as the biodegradability and flame resistance are not marred, but specifically include groups (I-1) to (I-12) shown in the following table 1.

In general formula (1), further, $R^6$, $R^7$, and $R^8$ each independently represents an alkylene group. The alkylene group may be any of straight chain or branched chain. The groups represented by $R^6$, $R^7$, and $R^8$ are not particularly limited as long as the biodegradability and flame resistance are not marred, but specifically include groups (II-1) to (II-12) shown in the following table 2. Of these groups, groups represented by (II-2), (II-4), and (II-6) are preferred because the groups can heighten compatibility with biodegradable polymers and furthermore maintain high mechanical strengths.

In general formula (1), n, p, and q each independently represents an integer of one or more. n, p, and q are preferably selected in view of mechanical strength so that the weight average molecular weights (polystyrene conversion) of compounds represented by general formula (1) are 3000 or more. In addition, n, p, and q are preferably selected in view of moldability in extrusion molding, injection molding, or the like so that the weight average molecular weights (polystyrene conversion) of compounds represented by general formula (1) are 500,000 or less. Furthermore, p:q preferably ranges from 1:20 to 10:1 in view of biodegradability and flame resistance well-balanced at a high level.

TABLE 1

| No. | Structural Formula |
|---|---|
| I-1 | —CH₃ |
| I-2 | —C₂H₅ |
| I-3 | —(CH₂)₂—CH₃ |
| I-4 | 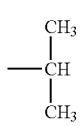 |
| I-5 | —(CH₂)₃—CH₃ |
| I-6 | 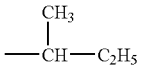 |
| I-7 | 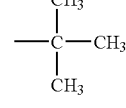 |
| I-8 | —(CH₂)₄—CH₃ |
| I-9 | —(CH₂)₅—CH₃ |
| I-10 | 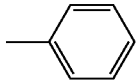 |
| I-11 |  |
| I-12 | 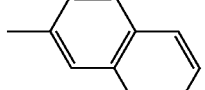 |

TABLE 2

| No. | Structural Formula |
|---|---|
| II-1 | —CH₂— |
| II-2 | —(CH₂)₂— |
| II-3 | —(CH₂)₃— |
| II-4 | —(CH₂)₄— |
| II-5 | —(CH₂)₅— |
| II-6 | —(CH₂)₆— |
| II-7 | —(CH₂)₇— |
| II-8 | —(CH₂)₈— |
| II-9 | 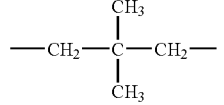 |
| II-10 | 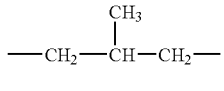 |
| II-11 | 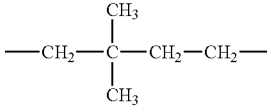 |
| II-12 | 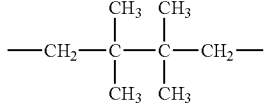 |

Preferred examples of the flame-retardant biodegradable materials of the invention are shown in the following tables 3 and 4.

TABLE 3

| No. | Structural Formula |
|---|---|
| III-1 | 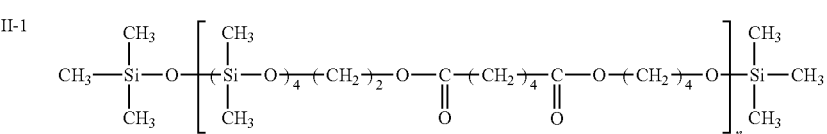 |

TABLE 3-continued
| No. | Structural Formula |
|---|---|
| III-2 | 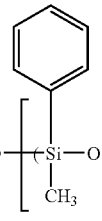 |
| III-3 | 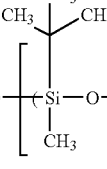 |
| III-4 | 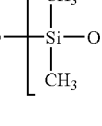 |
| III-5 | 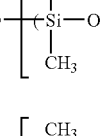 |
| III-6 | 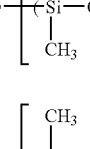 |
| III-7 | 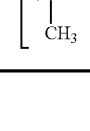 |
TABLE 4
| No. | Structural Formula |
|---|---|
| III-8 | 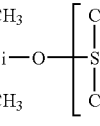 |
| III-9 | 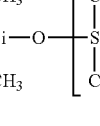 |
| III-10 | 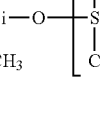 |

TABLE 4-continued

| No. | Structural Formula |
|---|---|
| III-11 | |
| III-12 | |
| III-13 | |
| III-14 | |

The flame-retardant biodegradable materials having the above-described structure are materials which can afford sufficient flame resistance to biodegradable polymers and further the flame-retardant biodegradable materials themselves have sufficient biodegradability and accordingly, never spoil the biodegradability of the biodegradable polymers. Furthermore, the flame-retardant biodegradable materials of the invention are useful also in view of recovery and recycle of resources. For example, the flame-retardant biodegradable materials of the invention are subjected to biodegradation in soil or water and thereby, silicone-containing components stemming from (poly)organosiloxane structures shown in general formula (1) can be separated and recovered from the residue after the biodegradation. The silicone-containing components are usually of low molecular weight and therefore, the purification thereof can be easily carried out and thus the purified components can be reused as the starting materials for the flame-retardant biodegradable materials of the invention.

Subsequently, the method for manufacturing the flame-retardant biodegradable material of the invention is described. The flame-retardant biodegradable materials can be prepared from a compound represented by the following general formula (2), a compound represented by the following general formula (3), a compound represented by the following general formula (4), and a compound represented by the following general formula (5). The ratio of these starting compounds used can be appropriately selected according to the structure of a desired flame-retardant biodegradable material. Stoichiometrically, to 1 mole of the compound represented by general formula (2), q mole of the compound represented by general formula (3), (q−1) mole of the compound represented by general formula (4), and 1 mole of the compound represented by general formula (5) are used.

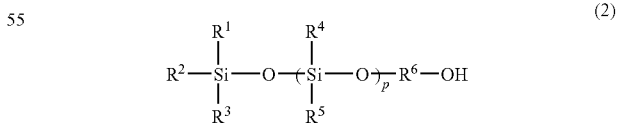

(2)

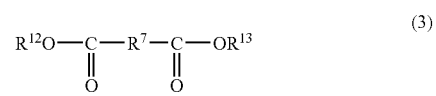

(3)

(4)

-continued

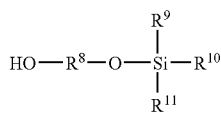

(5)

In the above-described general formula (2) to (5), $R^1$ to $R^{11}$ and p have the same meanings as $R^1$ to $R^{11}$ and p in general formula (1), respectively. That is, $R^1$, $R^2$, $R^3$, $R^4$, $R^5$, $R^9$, $R^{10}$, and $R^{11}$ each independently represents an alkyl group, an aryl group, or an aralkyl group and $R^6$, $R^7$, and $R^8$ each independently represents an alkylene group. Furthermore, $R^{12}$ and $R^{13}$ in general formula (3) each independently represents a hydrogen atom or an alkyl group and preferably a hydrogen atom or an alkyl group having one to five carbon atoms.

In the preparation of the biodegradable polymers where the compounds represented by the above-described general formulas (2) to (5) are used, a mixture of these starting compounds is heated in the presence of at least one of an esterification catalyst and a transesterification catalyst (first step).

For the esterification or transesterification, known catalysts of esterification or transesterification can be used, which include metallic acetates such as calcium acetate and manganese acetate, titanium compounds such as tetrabutoxytitanium, and metal oxides such as zinc oxide and tin trioxide. The amounts of catalysts are preferably adjusted depending upon the catalysts used. It is preferred that the first step is carried out in an inert atmosphere (more preferably in an atmosphere of nitrogen) in view of prevention of discoloration.

The temperature for heating is preferably from 200 to 250° C. High temperatures exceeding the upper limit promote thermal decomposition, leading to discoloration of the reaction product. Temperatures not reaching to the lower limit result in leading to insufficient reaction efficiency. In the reaction, it is preferred to heat gradually the starting mixture with stirring until the temperature thereof reaches the above-described range.

The reaction is accompanied by by-production of water in the esterification and of an alcohol in the transesterification. The end point of the reaction can be confirmed based on the amount of the by-products removed from the reaction system.

Subsequently, a polymerization catalyst is added to the reaction mixture obtained in the first step and the resulting mixture is heated under reduced pressure to form a polymer represented by the above-described general formula (1), that is, a flame-retardant biodegradable material of the invention (second step). Known catalysts can be used as the polymerization catalyst, that is, metal oxides such as germanium oxide, zinc oxide, and antimony trioxide and titanium compounds such as tetrabutoxytitanium. The amount of polymerization catalyst used is appropriately determined according to the structure of a desired polymer.

After adding the polymerization catalyst, the reaction is carried out under reduced pressure and then, the pressure is preferably 10 Pa or less. And on heating the temperature preferably ranges from 230 to 350° C. Temperatures exceeding the upper limit tend to cause thermal decomposition and discoloration. On the other hand, temperatures not reaching the lower limit may result in insufficient reaction efficiency, failing to obtain a sufficient molecular weight. In the reaction, the mixture obtained by heating at the first step preferably is gradually placed under reduced pressure and heated with stirring (preferably over a period of one to two hours) so that the pressure and temperature fall in the above-described ranges, respectively.

The torque value of agitation can be used as an index of the endpoint of polymerization reaction at the second step. After the reaction is complete, the contents are dissolved in a solvent such as tetrahydrofuran (THF) and poured into water to allow reprecipitation, thus separating a biodegradable polymer of the invention.

The flame-retardant biodegradable material of the invention obtained by the above-described method is a copolymer comprising a structural unit containing (poly)organosiloxane structure and a structural unit containing aliphatic (poly)ester structure. The copolymer may be any of random copolymer, block copolymer, and graft copolymer, and herein, the random copolymer is excellent in productivity and the block copolymer is excellent in biodegradability, flame resistance, and moreover, easiness in control of mechanical strength.

Subsequently, the flame-retardant degradable polymeric composition of the invention is described. The flame-retardant degradable polymeric composition of the invention contains a flame-retardant biodegradable material represented by the above-described general formula (1) and a biodegradable polymer.

The biodegradable polymers relating to the invention are not particularly limited so long as the polymers have biodegradability, that is, characteristics where the polymers are decomposed into carbon dioxide and water by microorganisms in soil or in water. Specifically, such polymers include cellulose such as starch, chitosan, cellulose acetate, and cellulose formate, polyhydroxy esters such as poly(glucolic acid), poly(vinyl alcohol), polycaprolactone, poly(lactic acid), poly(hydroxy butylate), and poly(hydroxy succinate), all aliphatic polyesters such as poly(butylene succinate) and poly(butylene adipate), aromatic group-containing polyesters such as polyethylene terephthalate-series copolymers and polyethylene naphthalate-series copolymers, and copolymers with these polymers or other polymers.

In the invention, the biodegradable polymers containing polyesters where parts or all of the acid and alcohol residues are aliphatic groups are preferred. In other words, the biodegradable polymer preferably comprises a polyester where parts or all of moieties connected to ester groups are aliphatic groups.

The "polyesters where parts or all of the acid and alcohol residues are aliphatic groups" stated herein include totally aliphatic polyesters where all of the acid and alcohol residues are aliphatic groups and partly aromatic polyesters where parts of acid and alcohol residues are aliphatic groups and the other parts thereof are aromatic groups.

Of these biodegradable polymers, poly(lactic acid), all aliphatic polyesters, and aromatic group-containing polyesters are preferred because a high flame resistance is acquired by combination with the flame-retardant biodegradable materials represented by general formula (1), and the poly(lactic acid) is particularly preferred in view of mechanical strength and heat resistance.

In the flame-retardant biodegradable polymeric compositions of the invention, the amount of flame-retardant biodegradable material represented by general formula (1) used to 100 weight parts of biodegradable polymer is preferably from 0.1 to 100 weight parts and more preferably from 0.5 to 10 weight parts.

Subsequently, the molded products of the invention are described. The molded products of the invention are prepared by molding the above-described flame-retardant biodegradable polymeric compositions of the invention.

Methods for molding the flame-retardant biodegradable polymeric compositions of the invention include injection molding, extrusion molding, blow molding, coating molding, cast molding, dipping molding, and the like.

Although the molded products of the invention are not particularly limited in uses, examples of the uses include housings of household appliances, business and office machines, precision machines, and the like, automobile parts such as bumpers and interior trims, building components such as wall coated sheets and rainwater pipes, clothing fibers, woven fabrics, nonwoven fabrics, packing sheets, bags, cushioning sheets, agricultural films, vegetation nets, medical appliances such as syringes and microchips, and other various sheets and films. Of these, the molded products of the invention are preferably used as housings and more preferably as housings for business and office machines because a system of product recovery is built up to recover easily the silicone-containing components stemming from (poly)organosiloxane structures of the compounds represented by general formula (1).

FIG. 1 is a schematic drawing showing an example of electrophotographic apparatus equipped with an outer housing relating to the molded product of the invention. Electrophotographic apparatus 220 shown in FIG. 1 is of an intermediate transfer system and in outer housing 400, four electrophotographic sensitive materials 401a to 401d (for example, electrophotographic sensitive material 401a can form an image of yellow color, electrophotographic sensitive material 401b an image of magenta color, electrophotographic sensitive material 401c an image of cyan color, and electrophotographic sensitive material 401d an image of black color, respectively) are arranged in parallel one another along intermediate transfer belt 409. The respective electrophotographic sensitive materials 401a to 401d can revolve to a constant direction (counter clockwise rotation on the paper surface) and electrification rolls 402a to 402d, development units 404a to 404d, primary transfer rolls 410a to 410d, and cleaning blades 415a to 415d are arranged along the rotative direction. Toners of four colors black, yellow, magenta, and cyan which are contained in toner cartridges 405a to 405d can be supplied to the development units 404a to 404d, respectively and the primary transfer rolls 410a to 410d are allowed to contact with electrophotographic sensitive materials 401a to 401d through the intermediate transfer belt 409, respectively.

Laser beam source (exposure unit) 403 is arranged in a certain position within the housing 400 and the electrified surfaces of the electrophotographic sensitive materials 401a to 401d can be irradiated with laser beam emitted from the laser beam source 403. Thus, in the rotating step of the electrophotographic sensitive materials (401a to 401d), the respective steps of electrification, exposure, development, primary transfer, and cleaning are successively carried out and the respective colors of toner images are repeatedly transferred onto the intermediate transfer belt 409.

The intermediate transfer belt 409 is supported with certain tension through driving roll 406, back-up roll 408, and tension roll 407 and can rotate without deflection by rotation of these rolls. Secondary transfer roll 413 is arranged so as to contact with the back-up roll 408 through the intermediate transfer belt 409. After passing between the back-up roll 408 and the secondary transfer roll 413, the intermediate transfer belt 409 is cleaned in surface by cleaning blade 416 arranged, for example, near the driving roll 406 and repeatedly used for the next image-forming process.

In a certain position within the housing 400, tray (transferred medium tray) 411 are provided, and transferred medium 417 such as paper in the tray 411 is transported successively between the intermediate transfer belt 409 and the secondary transfer roll 413 and further between two fixing rolls 414 contacting each other with the aid of transporting roll 412, thus paper being extruded out of the housing 400.

Since the molded products of the invention have sufficiently high biodegradability and flame resistance and further sufficient mechanical strength and heat resistance, the molded products are suitably used as the above-described outer housing of electrophotographic apparatus.

When halogen-series and phosphorus-series flame-retardant additives hitherto used are mixed with the biodegradable polymers to use for the molded materials, biodegradation of the molded materials results in leaving substances such as halogen and phosphorus suspected to be harmful in water or in compost. Therefore, these related-art molded materials fail to be subjected to waste disposal depending upon biodegradation. Furthermore, halogen and phosphorus combine chemically with the biodegradable polymers sometimes, which makes the chemical recycle of the polymers impossible. On the other hand, the molded products of the invention can evade the above-described problems by treating the molded products used for a certain period of time according to the below-described method of disposal of the invention.

That is, in the method of disposal of the molded products of the invention, the molded products are subjected to biodegradation, separating silicone-containing components from the residue.

When the molded products of the invention undergo biodegradation, the molded products are allowed to stand in compost or in water and as the compost, general compost may be used herein. Thus, the biodegradable polymer components and parts of the aliphatic (poly)ester structure in general formula (1) in a molded product can be decomposed into water and carbon dioxide. Appropriate adjustments of species and amount of microorganism, decomposition temperature, and time in a atmosphere where biodegradation treatment is carried out make it possible to stop the decomposition at the step of oligomer of a certain size or monomer. Moreover, purification of the oligomer or monomer makes chemical recycle possible.

On the other hand, a part of the (poly)siloxane structure (silicone-containing components) in general formula (1) remains as silicone-containing components without undergoing decomposition in the residue after the biodegradation treatment. Although the silicone-containing components exist as oligomers of some degrees of size in the residue, the components can be easily separated from the residue, for example, by adding water to the residue and performing separation through centrifugal filtration. Since the silicone-containing components separated in general are of low molecular weights, the components can be easily purified and thereafter can be recycled as starting materials for silicone-containing compounds (ex. polymers represented by general formula (1)). The silicone-containing components can be decomposed into silicon dioxide, water, and carbon dioxide by oxidation when allowed to stand for a long period of time.

EXAMPLES

The present invention is hereinafter described in detail through examples, but is not to be construed as limited by the examples.

Example 1

In this example, as a compound represented by general formula (2), a compound where $R^1$, $R^2$, $R^3$, $R^4$, and $R^5$ are methyl groups, $R^6$ is an ethylene group, and p is 4 (hereinafter referred to as compound (2-1)) is used. As a compound represented by general formula (3), a compound where $R^7$ is a butylene group and $R^{12}$ and $R^{13}$ are hydrogen atoms (hereinafter referred to as compound (3-1)) is used. As a compound represented by general formula (4), a compound where $R^8$ is a butylene group (hereinafter referred to as compound (4-1)) is used. Furthermore, as a compound represented by general formula (5), a compound where $R^8$ is a butylene group and $R^9$, $R^{10}$, and $R^{11}$ are methyl groups (hereinafter referred to as compound (5-1)) is used.

Five weight parts of the above-described compound (2-1), one weight part of compound (3-1), one weight part of compound (4-1), and one weight part of compound (5-1) are placed in a three-necked flask and 0.002 weight part of calcium acetate is added to these starting compounds. Nitrogen is flowed through this flask, the mixture is heated with stirring from room temperature to 220° C. at a rate of 30° C./hour, and water and alcohol distilled out are collected. It is confirmed that the quantity of distillate reached 90 percent or more of theoretical quantity.

Subsequently, 0.008 weight part of germanium oxide is placed in the flask, and the temperature of the resulting mixture is gradually raised from 220° C. to 280° C. with stirring while reducing gradually pressure in the flask from normal pressures to 10 Pa or less. The reaction is stopped when it is confirmed that the torque of agitation reached a desired value. The contents of the three-necked flask are chilled once to room temperature, dissolved in tetrahydrofuran, and reprecipitated in water, thus to obtain a polymer having a structure represented by formula (III-1) shown in Table 3 [weight average molecular weight (styrene conversion): 30,000, hereinafter referred to as polymer (III-1)].

Subsequently, three weight parts of polymer (III-1) and 97 weight parts of poly(lactic acid) (manufactured by Mitsui Chemicals, Inc. Laysia H100J) are placed in a kneader (produced by Technobel Co., Model KZW15-45MG) and underwent melt kneading at 240° C. to prepare pellets.

The pellets underwent injection molding through an injection molding machine (produced by Yamashiro Seiki Co.) at a melt temperature of 280° C. to prepare 1A type test specimens as described in JIS K-7162, 1A type test specimens stipulated by JIS K-7110, and test specimens for flame resistance test of 12.7×127 mm in width and length and 3.18 mm in thickness.

The resulting JIS K-7162 1A type test specimens are used to measure tensile break strength according to the method stipulated by JIS K-7162. The tensile break strength measurement according to JIS K-7162 is performed at 25° C., 55% RH with tensile speed of 20 mm/min by using Storograph V50 (produced by Toyo Seiki Seisaku-sho, LTD.).

The JIS K-7110 1A type test specimens are used to measure Izod impact strength according to the method stipulated by JIS K-7110. The Izod impact strength measurement according to JIS K-7110 is performed at 25° C., 55% RH by using DG-UB2 (produced by Toyo Seiki Seisaku-sho, LTD.).

Furthermore, the resulting test specimens for flame resistance test underwent the test of self-extinguishing properties by carrying out vertical flame test according to UL specification (UL-94). UL specification is a standard for safety regarding electric machines established and approved by UNDERWRITERS LABORATORIES INC. in USA. UL-94 is a standard defined by vertical flame test according to UL flame test method. There are V-0, V-1 and V-2 depending on the degree of flame retardancy, and getting closer V-1 indicates that the material has higher flame retardancy.

Furthermore the resulting pellets are used for evaluation of the biodegradability of the compound according to the method of JIS K-6953. 100 g of a sample is retained in 600 g of compost (Bio tender IGR-25 produced by Ishikawajima-harima Heavy Industries Co., Ltd.)) at 60° C. for 40 days, and then weight of the sample is measured to obtain biodegradation degree (%) by calculating a ratio of weight of the sample after the test to weight thereof before the test.

Results are shown in Table 5.

Example 2

First, polymer (III-1) is synthesized similarly to Example 1.

Subsequently, four weight parts of polymer (III-1) and 96 weight parts of polybutylene succinate/adipate (manufactured by Showa Kobunshi Co., BIONOLE #2000) are placed in a kneader (produced by Technobel Co., Model KZW15-45MG) and underwent melt kneading at 260° C. to prepare pellets.

The pellets underwent injection molding through an injection molding machine (produced Yamashiro Seiki Co.) at a melt temperature of 270° C. to prepare 1A type test specimens as described in JIS K-7162, 1A type test specimens stipulated by JIS-K-7110, and test specimens for flame resistance test of 100×200 mm in width and length and 3.18 mm in thickness.

About the respective test specimens thus prepared, the tensile break strength, Izod impact strength, self-extinguishing properties, and biodegradability are evaluated similarly to Example 1. Results are shown in Table 5.

Example 3

First, polymer (III-1) is synthesized similarly to example 1.

Subsequently, three weight parts of polymer (III-1) and 97 weight parts of polyethylene terephthalate (manufactured by E.I. du Pont de Nemours Co., Biomax WB100) are placed in a kneader (produced by Technobel Co., Model KZW15-45MG) and underwent melt kneading at 280° C. to prepare pellets.

The pellets underwent injection molding through an injection molding machine (produced by Yamashiro Seiki Co.) at a melt temperature of 290° C. to prepare 1A type test specimens as described in JIS K-7162, 1A type test specimens stipulated by JIS K-7110, and test specimens for flame resistance test of 100×200 mm in width and length and 3.18 mm in thickness.

About the respective specimens thus prepared, the tensile break strength, Izod impact strength, self-extinguishing properties, biodegradability are evaluated similarly to Example 1. Results are shown in Table 5.

Example 4

First, polymer (III-1) is synthesized similarly to Example 1.

Subsequently, three weight parts of polymer (III-1) and 97 weight parts of polyethylene terephthalate/adipate (produced by BASF Co., Ecoflex FBX7011) are placed in a kneader (produced by Technobel Co., Model KZW15-45MG) and melt kneaded at 280° C. to prepare pellets.

The pellets underwent injection molding through an injection molding machine (produced by Yamashiro Seiki Co.) at a melt temperature of 290° C. to prepare 1A type test specimens as described in JIS K-7162, 1A type test specimens stipulated by JIS K-7110, and test specimens for flame resistance test of 100×200 mm in width and length and 3.18 mm in thickness.

About the respective specimens thus prepared, the tensile break strength, Izod impact strength, self-extinguishing properties, and biodegradability are evaluated similarly to Example 1. Results are shown in Table 5.

Example 5

First, polymer (III-1) is synthesized similarly to Example 1.

Subsequently, one weight part of polymer (III-1) and 99 weight parts of poly(lactic acid) (manufactured by Mitsui Chemicals, Inc. Laysia H100J) are placed in a kneader (produced by Technobel Co., Model KZW15-45MG) and melt kneaded at 240° C. to prepare pellets.

The pellets underwent molding to prepare test specimens in a manner similar to Example 1 and the tensile break strength, Izod impact strength, self-extinguishing properties, and biodegradability of the specimens are evaluated similarly to Example 1. Results are shown in Table 5.

Example 6

First, polymer (III-1) is synthesized similarly to Example 1.

Subsequently, nine weight parts of polymer (III-1) and 91 weight parts of poly(lactic acid) (manufactured by Mitsui Chemicals, Inc., Laysia H100J) are placed in a kneader (produced by Technobel Co., Model KZW15-45MG) and melt kneaded at 240° C. to prepare pellets.

The pellets are formed and shaped into test specimens in the same method as in Example 1 and the tensile break strength, Izod impact strength, self-extinguishing properties, and biodegradability of the test specimens are evaluated similarly to Example 1. Results are shown in Table 5.

Example 7

In this example, a polymer represented by formula (III-2) in Table 3 [weight average molecular weight (styrene conversion): 40,000, hereinafter referred to as polymer (III-2)] is synthesized similarly to Example 1 except that a compound where $R^1$, $R^2$, $R^3$ and $R^5$ are methyl groups, $R^4$ is a phenyl group, $R^6$ is an ethylene group, and p is 9 [hereinafter referred to as compound (2-2)] is used in place of compound (2-1) as a compound represented by general formula (2).

Subsequently, pellets are prepared similarly to Example 1 except that polymer (III-2) is used in place of polymer (III-1).

The pellets are formed and shaped into test specimens in the same method as in Example 1 and the tensile break strength, Izod impact strength, self-extinguishing properties, and biodegradability of the test specimens are evaluated similarly to Example 1. Results are shown in Table 5.

Example 8

In this example, a compound where $R^1$, $R^2$, $R^3$, and $R^5$ are methyl groups, $R^4$ is a tert-butyl group, $R^6$ is an ethylene group, and p is 5 [hereinafter referred to as compound (2-3)] is used as a compound represented by general formula (2). A compound where $R^7$ is a hexylene group and $R^{12}$ and $R^{13}$ are hydrogen atoms [hereinafter referred to as compound (3-3)] is used as a compound represented by general formula (3). Similarly to Example 1, compound (4-1) is used as a compound represented by general formula (4). A compound where $R^8$ is a butylene group, $R^9$ and $R^{11}$ are methyl groups, and $R^{10}$ is a phenyl group [hereinafter referred to as compound (5-3)] is used as a compound represented by general formula (5).

Five weight parts of the above-described compound (2-3), two weight parts of compound (3-3), two weight parts of compound (4-1), and one weight part of compound (5-3) are placed in a three-necked flask, respectively, and 0.0018 weight part of calcium acetate is added to these starting compounds. Nitrogen is passed through the flask, the mixture is heated with stirring from room temperature to 220° C. at a rate of 30° C./hour, and water and alcohol distilled out are collected. It is confirmed that the quantity of distillate reached 90 percent or more of theoretical quantity.

Subsequently, 0.009 weight part of germanium oxide is placed in the flask, and the temperature of the resulting mixture is gradually raised with stirring over a period of 2 hour from 220 to 280° C. while reducing gradually the pressure in the flask from normal pressure to 10 Pa or less. The reaction is stopped when it is confirmed that the torque of agitation reached a desired value. The contents of the three-necked flask are once chilled to room temperature, dissolved in tetrahydrofuran, and reprecipitated in water, thus to obtain a polymer having a structure represented by formula (III-3) in Table 3 [weight average molecular weight (styrene conversion): 35,000, hereinafter referred to as polymer (III-3)].

Pellets are prepared similarly to Example 1 except that polymer (III-3) is used in place of polymer (III-1).

The pellets are formed and shaped into test specimens in the same method as in Example 1 and the tensile break strength, Izod impact strength, self-extinguishing properties, and biodegradability are evaluated similarly to Example 1. Results are shown in Table 5.

Comparative Example 1

Poly(lactic acid) (manufactured by Mitsui Chemicals, Inc., Laysia H100J) is singly used as a molding material and pellets are prepared in the same method as in Example 1.

The pellets are formed and shaped into test specimens in the same method as in Example 1, and the tensile break strength, Izod impact strength, self-extinguishing properties, and biodegradability are evaluated similarly to Example 1. Results are shown in Table 5.

Comparative Example 2

Ninety weight parts of poly(lactic acid) (manufactured by Mitsui Chemicals, Inc., Laysia H100J) and 10 weight parts of a phosphoric acid-series flame retardant additive (Irgafos 168) are placed in a kneader (produced by Technobel Co., Model KZW15-45MG) and melt kneaded at 240° C. to prepare pellets.

The pellets are formed and shaped into test specimens in the same method as in Example 1 and the tensile break strength, Izod impact strength, self-extinguishing properties, and biodegradability are evaluated similarly to Example 1. Results are shown in Table 5.

Comparative Example 3

Ninety weight parts of poly(lactic acid) (manufactured by Mitsui Chemicals, Inc. Laysia H100J) and 10 weight parts of an aromatic condensed phosphoric ester-series flame retardant additive (CR-741, manufactured by Daihachi Chemicals, Co.) are placed in a kneader (produced by Technobel Co., Model KZW15-45MG), and melt kneaded at 240° C. to prepare pellets.

The pellets are formed and shaped into test specimens in the same method as in Example 1 and the tensile break strength, Izod impact strength, self-extinguishing properties, and biodegradability are evaluated similarly to Example 1. Results are shown in Table 5.

Comparative Example 4

Ninety-five weight parts of polybutylene succinate/adipate (manufactured by Showa Kobunshi Co., Bionole #2000) and five weight parts of a phosphoric acid-series flame retardant additive (Irgafos 168) are placed in a kneader (produced by Technobel Co., Model KZW15-45MG) and melt kneaded at 240° C. to prepare pellets.

The pellets are formed and shaped into test specimens in the same method as in Example 1 and the tensile break strength, Izod impact strength, self-extinguishing properties, and biodegradability are evaluated similarly to Example 1. Results are shown in Table 5.

As may be seen from the table, the molded products of Examples 1 to 8 have excellent mechanical characteristics and realize flame resistance V-0 in UL-94 flame retardant grade. Further better biodegradability had been maintained.

as described in JIS K-7110 are cut out of the housing, and about the respective test specimens, the tensile break strength is measured according to the method of JIS K-7162 and the Izod impact strength is measured according to the method of JIS K-7110. Results are shown in Table 6.

Examples 10 to 16

In Examples 10 to 16, outer housings having the shape of a printer (DocuCentre Color 500, produced by Fuji Xerox Co., Ltd.) are molded similarly to Example 9 except that the pellets prepared in Examples 2 to 8 are used in place of the pellets prepared in Example 1, respectively. The resulting housings underwent the evaluations similarly to Example 9. Results are shown in Table 6.

Comparative Examples 5 to 8

In Comparative Examples 5 to 8, outer housings having the shape of a printer (DocuCentre Color 500, produced by Fuji Xerox Co., Ltd.) are molded similarly to Example 9 except that the pellets prepared in Comparative Example 1 to 4 are used in place of the pellets prepared in Example 1, respectively. The resulting housings underwent the evaluations similarly to Example 9. Results are shown in Table 6.

As may be seen from the results in Table 6, the housings of Examples 9 to 16 is able to maintain high mechanical

TABLE 5

| | Mechanical Strength | | Flame Resistance | | | Biodegradability |
|---|---|---|---|---|---|---|
| | Tensile Break Strength (MPa) | Izod Impact Strength (KJ/m$^2$) | Average Combustion Time (sec) | Dropping of Kindling Charcoal | Judgment | Biodegradability (%) |
| Example 1 | 72 | 3.5 | 3.8 | Absent | V-0 | 65 |
| Example 2 | 32 | 2.5 | 4.0 | Absent | V-0 | 62 |
| Example 3 | 39 | 2.0 | 3.9 | Absent | V-0 | 60 |
| Example 4 | 36 | 2.8 | 4.0 | Absent | V-0 | 60 |
| Example 5 | 70 | 3.3 | 4.4 | Absent | V-0 | 65 |
| Example 6 | 76 | 3.6 | 3.2 | Absent | V-0 | 66 |
| Example 7 | 70 | 3.6 | 3.5 | Absent | V-0 | 65 |
| Example 8 | 68 | 3.4 | 3.7 | Absent | V-0 | 64 |
| Comparative Example 1 | 70 | 2.8 | 20.0 | Exist | Off-specification | 60 |
| Comparative Example 2 | 62 | 2.0 | 6.5 | Exist | V-1 | 58 |
| Comparative Example 3 | 55 | 1.7 | 6.9 | Exist | V-1 | 55 |
| Comparative Example 4 | 25 | 2.0 | 8.9 | Exist | V-1 | 58 |

On the other hand, the molded product of Comparative Example 1 deteriorated in impact resistance and received the evaluation of off-specification in the UL-94 flame retardant grade. Furthermore, the molded products of Comparative Examples 2 to 4 deteriorated in impact resistance and suffered the evaluation of V-1 in the UL-94 flame retardant grade.

Example 9

The pellets prepared in Example 1 are formed and shaped into an outer housing having the shape of a printer (Docu-Centre Color 500, produced by Fuji Xerox Co., Ltd.) through an injection molding machine (produced by Nissei Jusi Co., FM8000). The resulting housing is allowed to stand for 10,000 hours in a constant temperature room of 25° C. at a relative humidity of 80% and thereafter, 1A type test specimens as described in JIS-K-7162 and 1A type test specimens strengths in spite of storage under the condition of high humidity for a long period of time. On the other hand, as to the housings of Comparative Examples 5 to 8, hydrolysis is promoted under the condition of high humidity and mechanical strengths caused significant deterioration. Particularly, in the housings of Comparative Examples 6 to 8, significant reductions in mechanical strengths are confirmed owing to the phosphoric acid-series flame retardant additive.

Example 17

The outer housing obtained in Example 9 is placed in compost (produced by NEC, volume 15 liters) Agitation is carried out at 35° C. for 72 hours under anaerobic conditions and complete degradation of the outer housing is confirmed by visual check. About 15 liters of the contents of the compost, 1 liter thereof is diluted with 4 liters of water, respectively, and underwent centrifugal filtration. Twenty-four grams of precipitate after the centrifugal filtration is washed with methanol to obtain compounds (2-1) and (5-1).

TABLE 6

| section | Mechanical Strengths after Standing for 10,000 hrs (25° C.-80% RH) | |
|---|---|---|
| | Tensile Break Strength (MPa) | Izod Impact Strength (KJ/m²) |
| Example 9 | 71 | 3.4 |
| Example 10 | 30 | 2.4 |
| Example 11 | 38 | 2.0 |
| Example 12 | 34 | 2.6 |
| Example 13 | 69 | 3.1 |
| Example 14 | 75 | 3.5 |
| Example 15 | 69 | 3.5 |
| Example 16 | 66 | 3.3 |
| Comparative Example 5 | 55 | 2.2 |
| Comparative Example 6 | 30 | 1.5 |
| Comparative Example 7 | 28 | 1.2 |
| Comparative Example 8 | 17 | 1.5 |

According to the invention, it is possible to provide flame-retardant biodegradable materials able to afford flame resistance while maintaining sufficiently the biodegradability of biodegradable polymer and a manufacturing method thereof. Moreover, according to the invention, it is possible to provide flame-retardant biodegradable polymer compositions and molded products thereof, and a method of disposal of the molded products.

The entire disclosure of Japanese Patent Application No. 2004-235559 filed on Aug. 12, 2004 including specification, claims, drawings and abstract is incorporated herein by reference in its entirely.

What is claimed is:

1. A flame-retardant biodegradable material comprising a compound represented by formula (1):

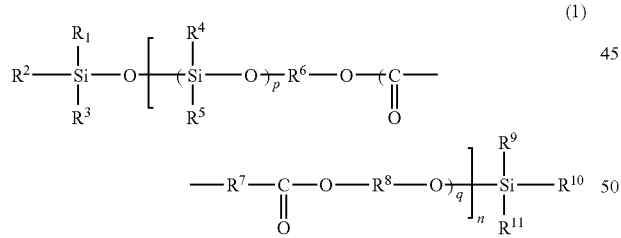

wherein $R^1$, $R^2$, $R^3$, $R^4$, $R^5$, $R^9$, $R^{10}$ and $R^{11}$ each independently represents an alkyl group, an aryl group or an aralkyl group; $R^6$, $R^7$ and $R^8$ each independently represents an alkylene group; and n, p and q each independently represents an integer of one or more.

2. The flame-retardant biodegradable material according to claim 1,
wherein $R^6$, $R^7$ and $R^8$ each independently represents a divalent group selected from the group consisting of groups (II-1), (II-2), (II-3), (II-4), (II-5), (II-6), (II-7), (II-8), (II-9), (II-10), (II-11) and (II-12)

| No. | Structural Formula |
|---|---|
| II-1 | —CH₂— |
| II-2 | —(CH₂)₂— |
| II-3 | —(CH₂)₃— |
| II-4 | —(CH₂)₄— |
| II-5 | —(CH₂)₅— |
| II-6 | —(CH₂)₆— |
| II-7 | —(CH₂)₇— |
| II-8 | —(CH₂)₈— |
| II-9 | —CH₂—C(CH₃)₂—CH₂— |
| II-10 | —CH₂—CH(CH₃)—CH₂— |
| II-11 | —CH₂—C(CH₃)₂—CH₂—CH₂— |
| II-12 | —CH₂—C(CH₃)₂—C(CH₃)₂—CH₂—. |

3. The flame-retardant biodegradable material according to claim 1,
wherein the compound represented by formula (1) is a compound selected from the group consisting of compounds (III-1), (III-2), (III-3), (III-4), (III-5), (III-6), (III-7), (III-8), (III-9), (III-10), (III-11), (III-12), (III-13) and (III-14)

| No. | Structural Formula |
|---|---|
| III-1 | CH₃—Si(CH₃)₂—O—[Si(CH₃)₂—O]₄—(CH₂)₂—O—C(=O)—(CH₂)₄—C(=O)—O—(CH₂)₄—O—[Si(CH₃)₂—]ₙ—CH₃ |

-continued
| No. | Structural Formula |
|---|---|
| III-2 | 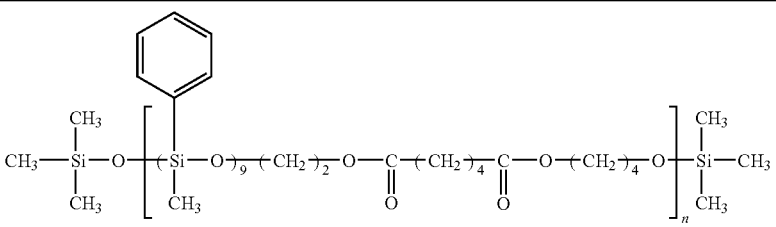 |
| III-3 | 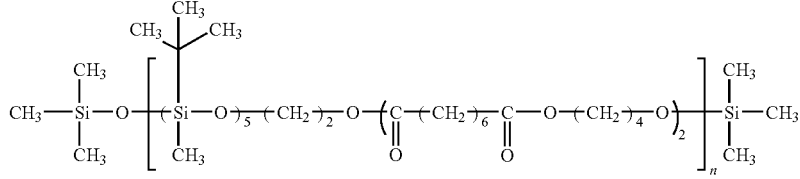 |
| III-4 | 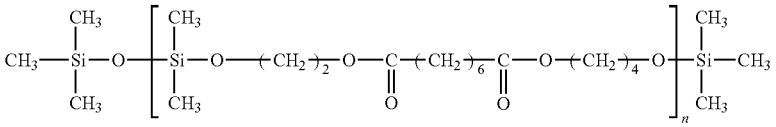 |
| III-5 | 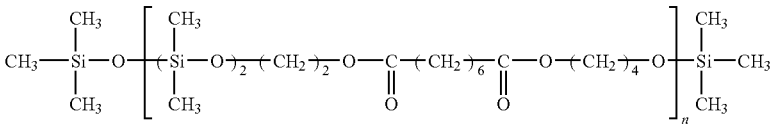 |
| III-6 | 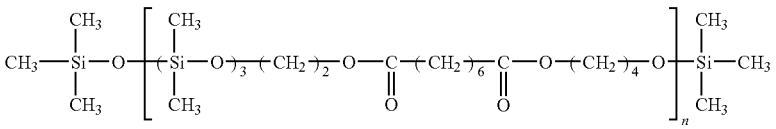 |
| III-7 | 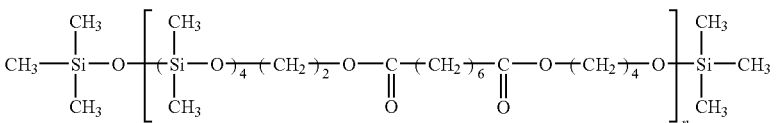 |
| III-8 | 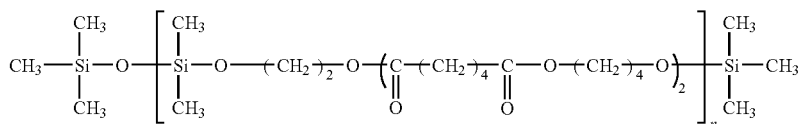 |
| III-9 | 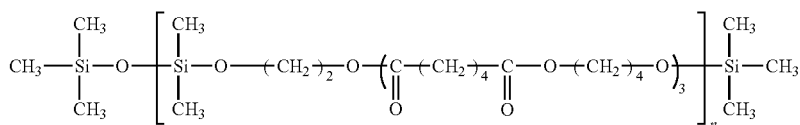 |
| III-10 | 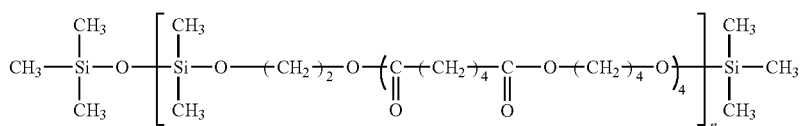 |
| III-11 | 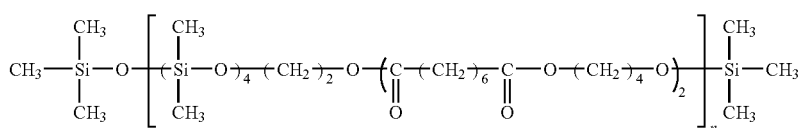 |

-continued

| No. | Structural Formula |
|---|---|
| III-12 | $\text{CH}_3-\underset{\underset{\text{CH}_3}{\mid}}{\overset{\overset{\text{CH}_3}{\mid}}{\text{Si}}}-O-\left[\underset{\underset{\text{CH}_3}{\mid}}{\overset{\overset{\text{CH}_3}{\mid}}{\text{Si}}}-O-(CH_2)_2-O-\left(\underset{\underset{O}{\|}}{C}-(CH_2)_4-\underset{\underset{O}{\|}}{C}-O-(CH_2)_4-O\right)_2\right]_n\underset{\underset{\text{CH}_3}{\mid}}{\overset{\overset{\text{CH}_3}{\mid}}{\text{Si}}}-\text{Ph}$ |
| III-13 | $\text{CH}_3-\underset{\underset{\text{CH}_3}{\mid}}{\overset{\overset{\text{CH}_3}{\mid}}{\text{Si}}}-O-\left[\underset{\underset{\text{CH}_3}{\mid}}{\overset{\overset{\text{CH}_3}{\mid}}{\text{Si}}}-O-(CH_2)_2-O-\left(\underset{\underset{O}{\|}}{C}-(CH_2)_4-\underset{\underset{O}{\|}}{C}-O-(CH_2)_4-O\right)_4\right]_n\text{SiPh}_3$ |
| III-14 | $\text{Ph}_3\text{Si}-O-\left[\underset{\underset{\text{CH}_3}{\mid}}{\overset{\overset{\text{CH}_3}{\mid}}{\text{Si}}}-O-(CH_2)_2-O-\left(\underset{\underset{O}{\|}}{C}-(CH_2)_4-\underset{\underset{O}{\|}}{C}-O-(CH_2)_4-O\right)_4\right]_n\text{SiPh}_3.$ |

\* \* \* \* \*